United States Patent
Sirotkin et al.

(10) Patent No.: US 9,398,503 B2
(45) Date of Patent: Jul. 19, 2016

(54) WIRELESS MODULE AND METHOD FOR LOCAL IP ACCESS PACKET DATA NETWORK RELEASE

(75) Inventors: Alexander Sirotkin, Tel-Aviv (IL); Chang Hong Shan, Shanghai (CN); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 13/991,362

(22) PCT Filed: Dec. 21, 2011

(86) PCT No.: PCT/US2011/066570
§ 371 (c)(1),
(2), (4) Date: Aug. 20, 2013

(87) PCT Pub. No.: WO2013/019263
PCT Pub. Date: Feb. 7, 2013

(65) Prior Publication Data
US 2014/0177590 A1   Jun. 26, 2014

Related U.S. Application Data

(60) Provisional application No. 61/514,010, filed on Aug. 1, 2011.

(51) Int. Cl.
*H04W 36/08* (2009.01)
*H04W 12/06* (2009.01)
(Continued)

(52) U.S. Cl.
CPC .............. *H04W 36/08* (2013.01); *H04W 4/001* (2013.01); *H04W 12/06* (2013.01); *H04W 36/14* (2013.01);
(Continued)

(58) Field of Classification Search
CPC . H04W 36/0022; H04W 36/08; H04W 36/14; H04W 36/0011; H04W 36/0016; H04W 36/0033; H04W 36/0072; H04W 4/005; H04W 68/12; H04W 72/0426; H04W 76/046; H04W 52/0225; H04W 72/02; H04W 12/06; H04W 8/06; H04W 4/001
See application file for complete search history.

(56) References Cited

U.S. PATENT DOCUMENTS

2010/0272013 A1  10/2010  Horn et al.
2011/0045834 A1*  2/2011  Kim et al. ..................... 455/438
(Continued)

FOREIGN PATENT DOCUMENTS

WO   WO-2010138634 A2   12/2010
WO   WO-2013019263 A1    2/2013

OTHER PUBLICATIONS

"International Application Serial No. PCT/US2011/066570, Search Report mailed Aug. 30, 2012", 3 pgs.
(Continued)

*Primary Examiner* — Hoang-Chuong Vu
(74) *Attorney, Agent, or Firm* — Schwegman Lundberg & Woessner, P.A.

(57) ABSTRACT

Various embodiments include systems, wireless modules, and methods for local IP access packet data network release. Handover data can be received at a target wireless module as part of a user equipment handover operation. The user equipment can include an active packet data network session associated with a source local home network. A determination that the target wireless module is not in the source local home network can be made based on the handover data. The target wireless module can trigger deactivation of the packet data network session in response to the determination that the target wireless module is not in the source local home network.

21 Claims, 9 Drawing Sheets

(51) Int. Cl.
*H04W 72/02* (2009.01)
*H04W 52/02* (2009.01)
*H04W 36/14* (2009.01)
*H04W 4/00* (2009.01)
*H04W 76/04* (2009.01)
*H04W 36/00* (2009.01)

(52) U.S. Cl.
CPC .......... *H04W 52/0225* (2013.01); *H04W 72/02* (2013.01); *H04W 4/005* (2013.01); *H04W 36/0038* (2013.01); *H04W 76/046* (2013.01); *Y02B 60/50* (2013.01)

(56) References Cited

U.S. PATENT DOCUMENTS

| | | | |
|---|---|---|---|
| 2011/0170517 A1 | 7/2011 | Bakker et al. | |
| 2011/0274087 A1* | 11/2011 | Liang | H04W 76/064 370/331 |
| 2012/0076121 A1* | 3/2012 | Choi et al. | 370/338 |
| 2012/0151030 A1* | 6/2012 | Guttman et al. | 709/223 |
| 2012/0182912 A1* | 7/2012 | Watfa et al. | 370/311 |
| 2012/0182972 A1* | 7/2012 | Guan | H04W 76/021 370/331 |
| 2012/0189016 A1* | 7/2012 | Bakker et al. | 370/401 |
| 2012/0224536 A1* | 9/2012 | Hahn | H04L 45/00 370/328 |
| 2012/0294236 A1* | 11/2012 | Watfa et al. | 370/328 |
| 2013/0003698 A1* | 1/2013 | Olvera-Hernandez et al. | 370/331 |
| 2013/0089076 A1* | 4/2013 | Olvera-Hernandez et al. | 370/332 |
| 2013/0301610 A1* | 11/2013 | Ali | H04W 36/08 370/331 |
| 2014/0003241 A1* | 1/2014 | Kim et al. | 370/235 |

OTHER PUBLICATIONS

"International Application Serial No. PCT/US2011/066570, Written Opinion mailed Aug. 30, 2012", 4 pgs.

"Lock PDN Connection", http://ftp.3gpp2.org/TSGX/Working/2011/2011-01-Seattle/TSG-X-2011-01-Seattle/WG5-PDS/X.S0057-A%20RnF/SFs/SD-220.1Ar0-RnF-ALU Lock PDN Connection.doc See p. 1, (Jan. 31, 2011).

"European Application Serial No. 11870241.4, Extended European Search Report mailed May 4, 2015", 6 pgs.

"International Application Serial No. PCT/US2011/066570, International Preliminary Report on Patentability mailed Feb. 13, 2014", 6 pgs.

"LIPA Deactivation", Intel Corporation 3GPP Draft; S2-113142_LIPA_Deactivation, 3rd Generation Partnership Project (3GPP), vol. SA WG2,, (Jul. 5, 2011), 1 pg.

Huawei, Hisilicon, et al., "Call flows for Stand-alone logical L-GW solution", 3GPP Draft; S2-113774.ZIP:S2-113774_3755_3751_3295 Call Flows for Stand-Alone Logical L-GW Solution V 1.8, 3rd Generation Partnership Project (3GPP) vol. SA WG2, no. Naantali, (Jul. 15, 2011).

* cited by examiner

WIRELESS MODULE AND METHOD FOR LOCAL IP ACCESS PACKET DATA NETWORK RELEASE

CLAIM OF PRIORITY

This patent application is a U.S. National Stage Filing under 35 U.S.C. 371 from International Patent Application Serial No. PCT/US2011/066570, filed Dec. 21, 2011, published on Feb. 7, 2013 as WO2013/019263A1, which claims the benefit of priority to U.S. Provisional Patent Application Ser. No. 61/514,010, filed on Aug. 1, 2011, both of which are hereby incorporated by reference herein their entirety.

BACKGROUND

Cellular networks provide many services to user equipment (UE) attached to those networks. Example cellular networks can operate in accordance with one or more 3rd Generation Partnership Project (3GPP) standards, including: global system for mobile communication (GSM) enhanced data rates for GSM evolution (EDGE) radio access network (GERAN); universal mobile telecommunications system (UMTS); long term evolution (LTE) including universal terrestrial radio access network (UTRAN); LTE advanced (LTE-A) including evolved UMTS terrestrial radio access network (E-UTRAN). 3GPP release 10, released Q1 2011, and releases 11 and beyond, include, for example specifications for the GERAN, UMTS, LTE and LTE-A families of standards.

Cellular networks generally include a number of cells that provide the UE with a wireless link to the network and its services. A variety of cells can constitute the cellular network. These cell types are generally differentiated by their effective communication ranges. Example, cell types can include macrocells, microcells, picocells, and femtocells. Shorter range cells, such as femtocells, can be used to create localized networks, such as local home networks (LHNs). For example, one or more femtocells can be used in a warehouse to create an LHN servicing the warehouse. A variety of elements, defined in cellular network specifications, support a cell. As used herein, wireless module (e.g., wireless infrastructure module) refers to these discreet elements. In LTE and LTE-A networks, eNBs provide radio access and control. In UMTS networks, nodeBs and radio network controllers (RNCs) are used. In GERAN networks, bases station systems (BSSs) are used. In the warehouse example, under LTE-A, a home eNB (HeNB) is used. BSSs, NodeBs, RNCs, eNBs, and HeNBs are all examples of a wireless module.

A UE can move between cells provoking one or more handover operations between cells and the UE. The LTE and LTE-A specifications include interfaces to facilitate communications between cells. For example, E-UTRAN to E-UTRAN handover can be accomplished via the S1 interface and the X2 interface. E-UTRAN to UTRAN handover can be accomplished via the Iu interface and E-UTRAN to GERAN handover can be accomplished via the A/Gb interfaces.

Packet data network (PDN) access, such as to the Internet, can be a service offered by the cellular network to UE. Example wireless modules that directly or indirectly participate in providing PDN access include, in LTE-A and LTE, MMEs local gateways (L-GWs), PDN gateways (P-GWs) and, in UMTS, gateway general packet radio service (GPRS) support nodes (GGSNs) and server GPRS support nodes (SGSNs). Generally, the cellular network includes a gateway (e.g., L-GW, P-GW or GGSN) to provide the PDN access. Generally, the gateway assigns PDN characteristics to the UE to facilitate this access. When a UE moves from one cell to another, the new cell may not have access to, or it may be inefficient to use, the gateway to the PDN. If the UE has an active PDN session and moves from one cell to another, the PDN connection may need to be deactivated if the target cell will use a different gateway than the gateway responsible for establishing the PDN connection. For example, when a target eNB does not have access to an L-GW used to establish the PDN connection. In an LHN, cells can access the site's local area network (LAN) to provide the PDN access. This is known as local IP access (LIPA). An example of an LTE-A LIPA PDN release procedure, part of the PDN deactivation, is the 3GPP TS 23.401-a21 specification (released Jan. 4, 2011), which defines a mobility management entity (MME) PDN release procedure at clause 5.4.4.2 (MME release procedure). In an example of LIPA PDN release in a 3GPP release 10 system, the local gateway (L-GW) collocated with an eNB can release the LIPA PDN session.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In an LTE-A LHN, the LIPA LAN can be used by more than one cell (e.g., eNB) of the LHN. This is known as LIPA mobility within the LHN. To enhance a user's experience using an LHN, it is a goal of cellular networks to maintain PDN connections when possible to avoid service interruptions. However, when the UE transitions to a cell that is not in the LHN, the PDN connection is deactivated due to LIPA LAN access considerations. The decision to deactivate the PDN session can reside in the source HeNB, for example, by maintaining a listing of LHN HeNBs and triggering PDN deactivation when the cell is transitioning to a cell outside of the LHN. In this case, the source HeNB would need to maintain a list of active HeNBs in the LHN and update this list over time. Maintaining the list of LHN HeNBs can consume resources, such as storage space and processing time, among others.

A target wireless module is arranged to know its network identification (ID), such as its LHN ID. During a handover operation, the UE network ID is communicated to the target wireless module. Thus, an efficient decision to deactivate the PDN session can be made at the target wireless module by comparing the LHN ID of the UE to that of the target wireless module. In this way, waste of the networks' resources can be spared because the maintenance of LHN HeNBs is not required.

Figure 1:
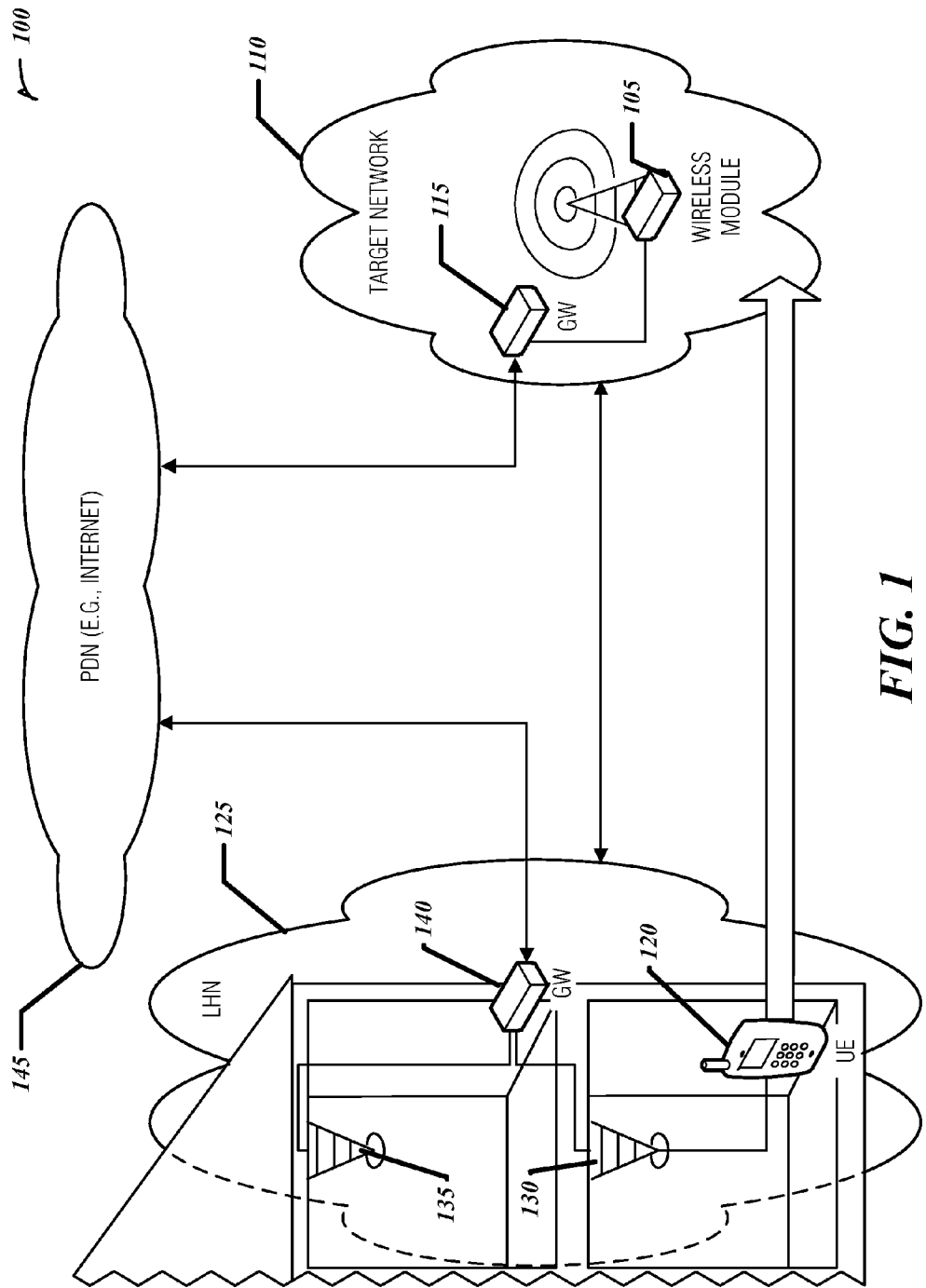
FIG. 1 illustrates and example system for LIPA PDN release, according to an embodiment.

FIG. 1 illustrates and example system 100 for LIPA PDN release, according to an embodiment. The system 100 can include: a target wireless module 105 in a target network 110 that also includes a L-GW 115; a source LHN 125 including HeNB 130, HeNB 135, L-GW 140; and a PDN 145. The system 100 also includes a UE 120, shown to be connected to the HeNB 130 and transitioning to the target network 110. The source LHN 125 and the target network 110 are communicatively coupled to transfer information for UE 120 handover facilitation, among other things.

The target wireless module 105 can be arranged to receive handover data as part of a UE 120 handover operation. The UE 120 can include an active PDN session associated with the source LHN 125. The target wireless module 105 can be arranged to determine that it is not in the source LHN 125 based on the handover data. The target wireless module 150 can be arranged to trigger deactivation of the PDN session in response to the determination that it is not in the source LHN 125. Thus, the decision to deactivate the PDN session can be made quickly and efficiently. In an example, the target wireless module 105 is arranged to trigger the PDN session deactivation by indicating that the LIPA bearer of the PDN session will not be used in the target network 110. The source MME in the source LHN 125 can then perform the PDN session deactivation for PDN sessions whose LIPA bearers will not be used in the target network 110. In an example, the MME (e.g., the source MME in the source LHN 125) uses the MME release procedure to deactivate the PDN session. In an example, the target wireless module 105 is arranged to indicate that the LIPA bearer will not be used in the target network 110 by omitting the LIPA bearer in a handover acknowledge message.

In an example, the target wireless module 105 can be arranged to trigger deactivation of the PDN session during a handover preparation operation. By making the decision early in the handover process, the source LHN 125 and target network 110 can avoid maintain PDN session information. This can reduce costs and increase operating efficiency by reducing the computational burden on the networks. Examples of triggering PDN session deactivation during handover preparation are given below in FIGS. 2 through 5.

In an example, the target wireless module 105 can be arranged to trigger deactivation of the PDN session during a handover completion operation. As used herein a handover completion operation is a part of the UE 120 handover operation that occurs after handover preparation and handover execution operations. At handover completion, the UE 120 has transitioned to the target network 110. Thus, there is no chance that the UE 120 will not complete the handover operation. In contrast, during handover preparation, there is a chance that the UE 120 will not complete the handover. By waiting until the handover completion operation, the target wireless module 105 can ensure that the PDN session is deactivated only when the source L-GW 140 will not be used for UE 120 PDN 145 access. Examples of triggering PDN session deactivation during handover completion are given below in FIGS. 6 through 9.

FIGS. 2 through 9 illustrate portions of UE 120 handover operation sequence diagrams. The y-axis is time and the x-axis includes the network components involved in sending UE 120 handover operation messages. For clarity, some messages in an illustrated handover operation may be omitted. Further, solid message lines indicate a message carrying the target wireless module indication that a LIPA bearer will not be used in the target network 110 while dashed lines indicate messages and dashed boxes indicate groups of operations involved in the handover operation to provide context for the solid line messages within the illustrated handover operations.

Figure 2:
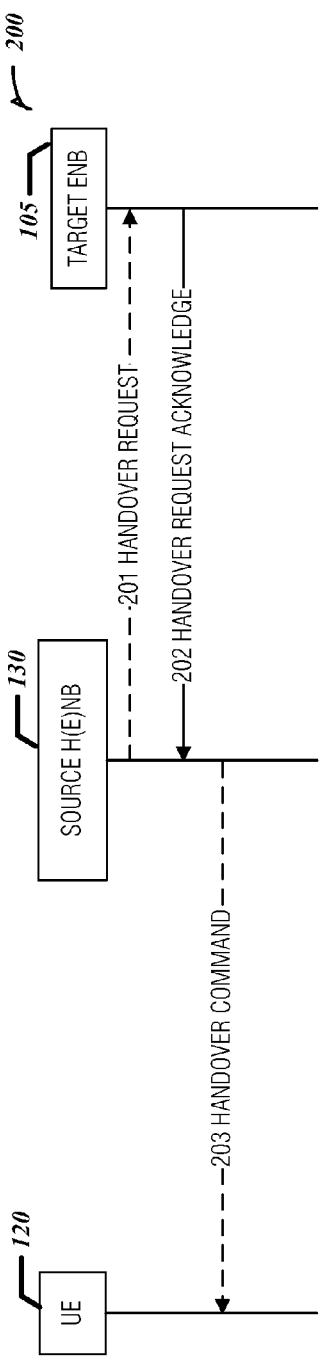
FIG. 2 is an example of an X2 interface sequence diagram illustrating portions of a handover preparation operation, according to an embodiment.

FIG. 2 is an example of an X2 interface sequence diagram illustrating portions of a handover preparation operation 200, according to an embodiment. In this example, the target wireless module 105 is a HeNB in accordance with a post 3GPP release 10 family of standards (e.g., release 11 and beyond). The following are the illustrated X2 application protocol (X2AP) messages in accordance with, for example, the 3GPP release 11 family of standards: a handover request 201, a handover request acknowledge 202, and a handover command 203.

The part of the UE 120 handover operation received by the target wireless module 105 can be the handover request 201. The handover request 201 can include the UE LHN-ID for the UE 120 and can also include the LIPA bearer for the PDN session. In order to determine that the target wireless module 105 is not in the source LHN 125, the target wireless module 105 can be arranged to determine that an LHN-ID of the target wireless module 105 is different than the UE LHN-ID. In order to trigger deactivation of the PDN session, the target wireless module 105 can be arranged to omit, from the X2AP handover request acknowledge 202, the LIPA bearer. In an example, the, the source HeNB 130 can deactivate the LIPA PDN session by sending an indication of bearer release message to the MME as specified in the MME release procedure and omits the LIPA bearer in the following handover.

Figure 3:
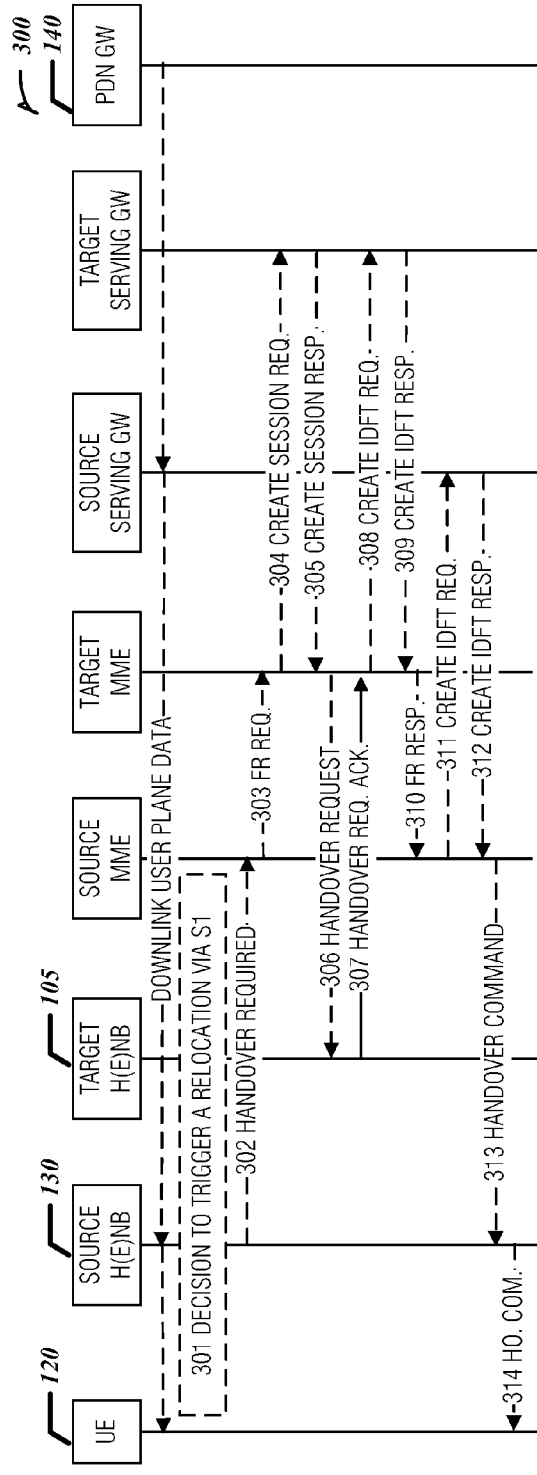
FIG. 3 is an example of an S1 interface sequence diagram illustrating portions of a handover preparation operation, according to an embodiment.

FIG. 3 is an example of an S1 interface sequence diagram illustrating portions of a handover preparation operation 300, according to an embodiment. In an example, the target wireless module is a HeNB in accordance with the 3GPP post 3GPP release 10 family of standards (e.g., release 11 and beyond). The following are the illustrated S1 application protocol (S1AP) messages and operational groups in accordance with, for example, the 3GPP release 11 family of standards: decision to trigger a relocation via S1 301, a handover required message 302, a forward relocation request 303, a create session request 304, a create session response 305, a handover request 306, a handover request acknowledge 307, a create indirect data forwarding tunnel request 308, a create indirect data forwarding tunnel response 309, a forward relocation response 310, a create indirect data forwarding tunnel request 311, a create indirect data forwarding tunnel response 312, a handover command 313, and a handover command 314.

The part of the UE 120 handover operation received by the target wireless module 105 can be the handover request 306.

The handover request 306 can include the UE LHN-ID for the UE 120 and can include the LIPA bearer for the PDN session. In order to determine that the target wireless module 105 is not in the source LHN 125, the target wireless module 105 can be arranged to determine that an LHN-ID of the target wireless module 105 is different than the UE LHN-ID. In order to trigger deactivation of the PDN session, the target wireless module 105 can be arranged to omit, from the handover request acknowledge 307, the LIPA bearer. In an example, when receiving the handover request acknowledge 307, the target MME can deactivate the LIPA PDN session using the MME release procedure. In an example, when receiving the forward relocation response 310, the source MME can deactivate the LIPA PDN session(s) using the MME release procedure.

In an example, the target wireless module 105 can be a HeNB in accordance with the 3GPP release 10 family of standards while the messages are in accordance with a later 3GPP release (e.g., release 11 and beyond) family of standards. The part of the UE 120 handover operation received by the target wireless module 105 is the handover request 306. The handover request 306 can include at least one E-UTRAN radio access bearer (E-RAB) information element (IE) not defined in the 3GPP release 10 family of standards. The at least E-RAB IE is associated with the LIPA bearer for the PDN session. In order to trigger deactivation of the PDN session, the target wireless module 105 can be arranged to omit, from the handover request acknowledge 307, the at least one E-RAB IE.

Figure 4:
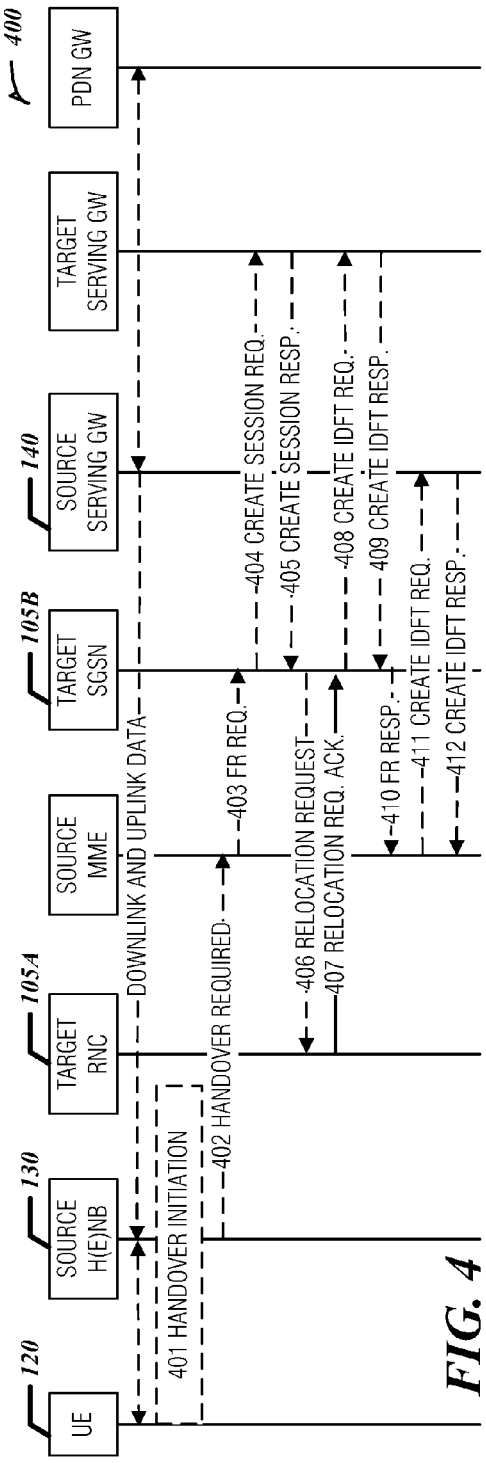
FIG. 4 is an example of an Iu interface sequence diagram illustrating portions of a handover preparation operation, according to an embodiment.

FIG. 4 is an example of an Iu interface sequence diagram illustrating portions of a handover preparation operation 400, according to an embodiment. In this example, the target wireless module 105 can be an RNC in accordance with the UMTS family of standards. The following are the illustrated Iu UMTS messages and operational groups: handover initiation 401, a handover required message 402, a forward relocation request 403, a create session request 404, a create session response 405, a relocation request 406, a relocation request acknowledge 407, a create indirect data forwarding tunnel request 408, a create indirect forwarding tunnel response 409, a forward relocation response 410, a create indirect forwarding tunnel request 411, and a create indirect forwarding tunnel response 412.

The part of the UE 120 handover operation received by the target wireless module 105 is the relocation request 406. The relocation request 406 can include UE LHN-ID for the UE 120 and include the LIPA bearer for the PDN session. In order to determine that the target wireless module 105 is not in the source LHN 125, the target wireless module 105 can be arranged to determine that the LHN-ID of the target wireless module 105 is different than the UE LHN-ID. In order to trigger deactivation of the PDN session, the target wireless module 105 can be arranged to omit, from the relocation request acknowledge 407, the LIPA bearer. In an example, after receiving the forward relocation response 410, the source MME can deactivate the LIPA PDN session(s) using the MME release procedure.

Figure 5:
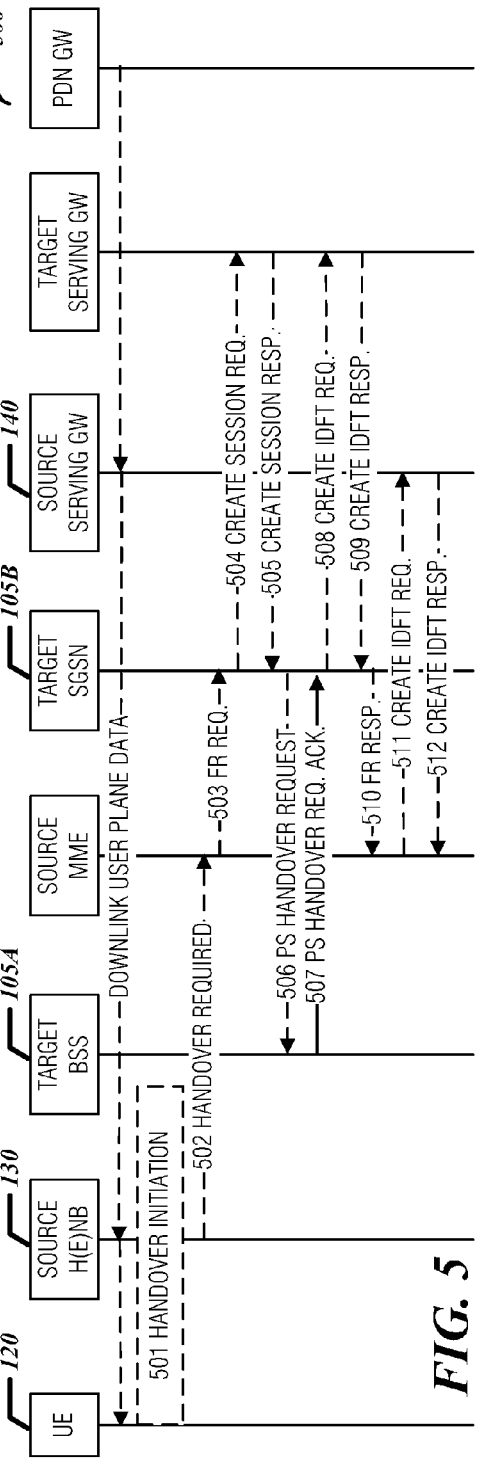
FIG. 5 is an example of an A/Gb interface sequence diagram illustrating portions of a handover preparation operation, according to an embodiment.

FIG. 5 is an example of an A/Gb interface sequence diagram illustrating portions of a handover preparation operation 500, according to an embodiment. In this example, the target wireless module 105 can be a BSS in accordance with the GERAN family of standards. The following are the illustrated A/Gb messages and operational groups: handover initiation 501, a handover required message 502, a forward relocation request 503, a create session request 504, a create session response 505, a path switch handover request 506, a path switch handover request acknowledge 507, a create indirect data forwarding tunnel request 508, a create indirect forwarding tunnel response 509, a forward relocation response 510, a create indirect forwarding tunnel request 511, and a create indirect forwarding tunnel response 512.

The part of the UE 120 handover operation received by the target wireless module 105 is the relocation request path switch handover request 506. The path switch handover request 506 can include UE LHN-ID for the UE 120 and include the LIPA bearer for the PDN session. In order to determine that the target wireless module 105 is not in the source LHN 125, the target wireless module 105 can be arranged to determine that the LHN-ID of the target wireless module 105 is different than the UE LHN-ID. In order to trigger deactivation of the PDN session, the target wireless module 105 can be arranged to omit, from the path switch handover request acknowledge 507, the LIPA bearer. In an example, after receiving the forward relocation response 510, the source MME can deactivate the LIPA PDN session(s) using the MME release procedure.

Figure 6:
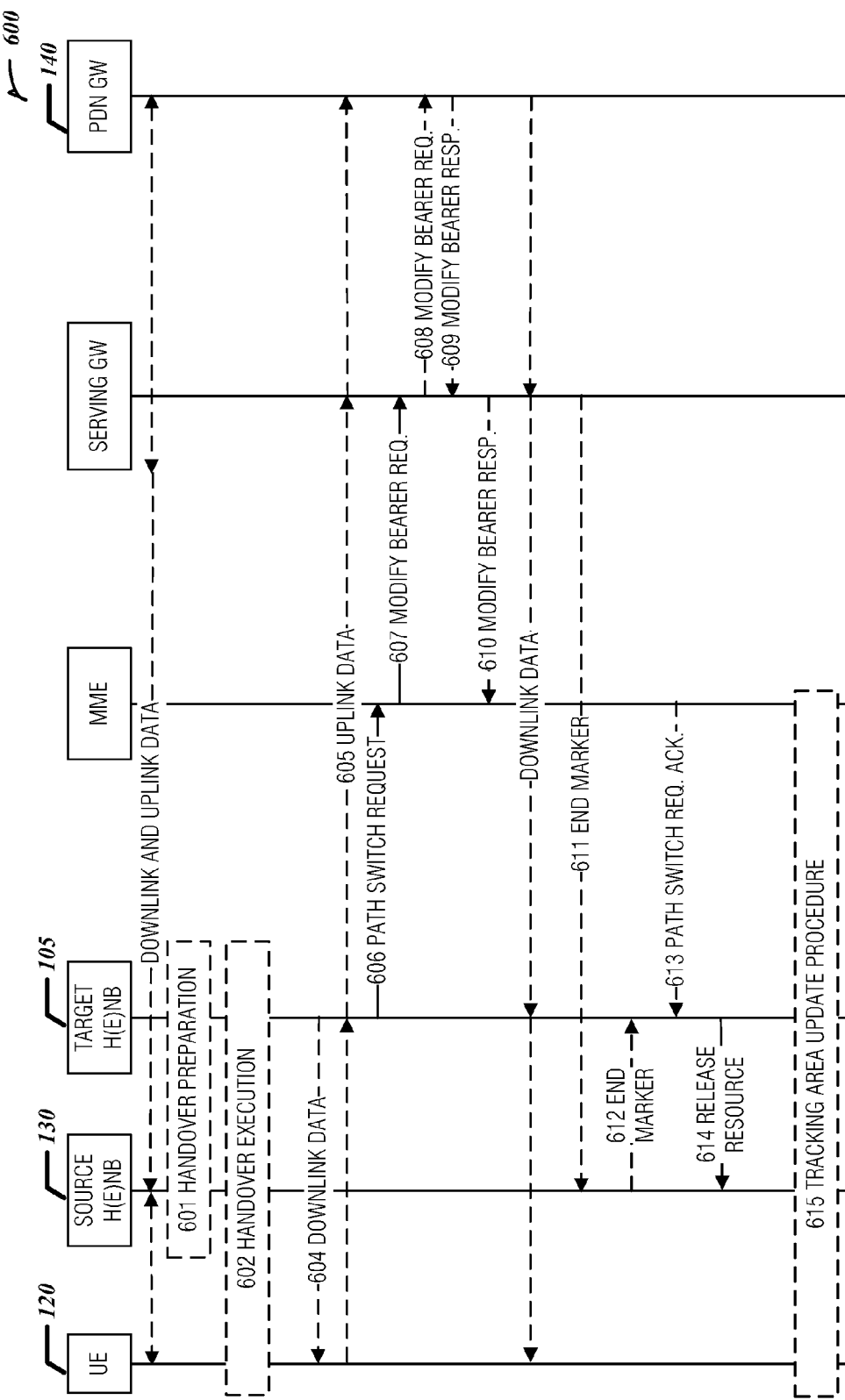
FIG. 6 is an example of an X2 interface sequence diagram illustrating portions of handover completion operation, according to an embodiment.

FIG. 6 is an example of an X2 interface sequence diagram illustrating portions of handover completion operation 600, according an embodiment. In this example, the target wireless module 105 is a HeNB in accordance with post 3GPP release 10 family of standards (e.g., release 11 and beyond). The following are the illustrated messages and operational groups in accordance with, for example, the 3GPP release 11 family of standards (message protocol type in parens): handover preparation 601 (X2AP), handover execution 602 (X2AP), downlink data 604 (RRC), uplink data 605 (GTP-U), a path switch request 606 (S1AP), a modify bearer request 607 (GTP-C), a modify bearer request 608 (GTP-C), a modify bearer response 609 (GTP-C), a modify bearer response (GTP-C), an end marker 611 (GTP-U), an end marker 612 (GTP-U), a path switch request acknowledge 613 (S1AP), a release resource message 614 (X2AP), and a tracking area update procedure 615 (NAS).

The part of the UE 120 handover operation received by the target wireless module 105 can be one or more X2AP messages (e.g., from the handover preparation 601, the handover execution 602, or any illustrated message). The one or more X2AP messages can include the UE LHN-ID for the UE 120 and can also include the LIPA bearer for the PDN session. In order to determine that the target wireless module 105 is not in the source LHN 125, the target wireless module 105 can be arranged to determine that an LHN-ID of the target wireless module 105 is different than the UE LHN-ID. In order to trigger deactivation of the PDN session, the target wireless module 105 can be arranged to omit, from path switch request 606, the LIPA bearer.

Figure 7:
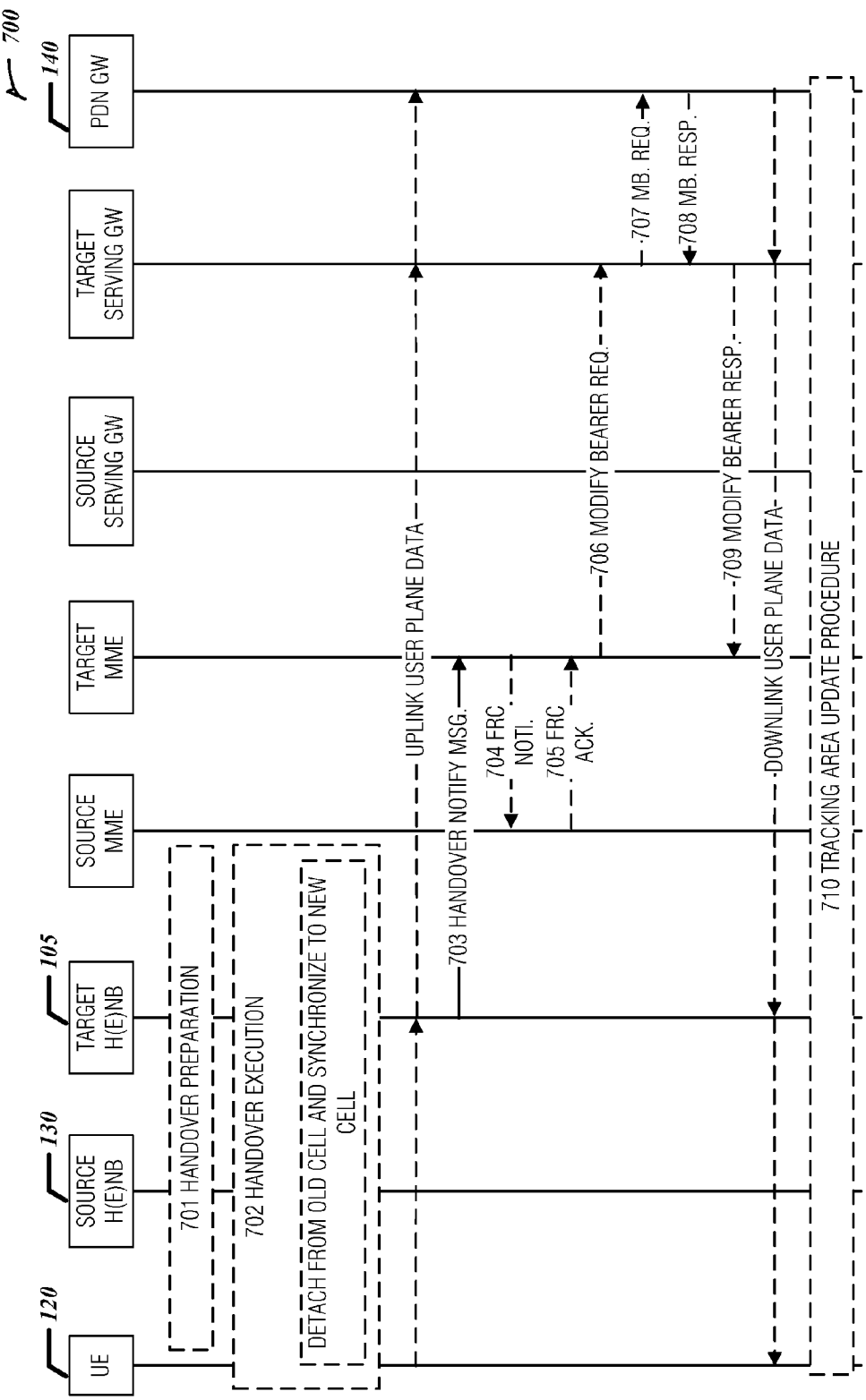
FIG. 7 is an example of an S1 interface sequence diagram illustrating portions of handover completion operation, according to an embodiment.

FIG. 7 is an example of an S1 interface sequence diagram illustrating portions of handover completion operation 700, according to an embodiment. The following are the illustrated messages and operational groups in accordance with, for example, the 3GPP release 11 family of standards (message protocol type in parens): handover preparation 701 (S1AP), handover execution 702 (S1AP), a handover notify message 703 (S1AP), a forward relocation complete notification 704 (GTP-C), a forward relocation complete acknowledge 705 (GTP-C), a modify bearer request 706 (GTP-C), a modify bearer request 707 (GTP-C), a modify bearer response 708 (GTP-C), a modify bearer response 709 (GTP-C), and a tracking area update procedure 710 (NAS).

The part of the UE 120 handover operation received by the target wireless module 105 can be one or more S1AP messages (e.g., from the handover preparation 701, the handover execution 702, or any illustrated message). The one or more S1AP messages can include the UE LHN-ID for the UE 120 and can include the LIPA bearer for the PDN session. In order to determine that the target wireless module 105 is not in the source LHN 125 the target wireless module 105 can be arranged to determine that an LHN-ID of the target wireless module 105 is different than the UE LHN-ID.

In an example, the target wireless module is a HeNB in accordance with the post 3GPP release 10 family of standards (e.g., release 11 and beyond). In order to trigger deactivation of the PDN session, the target wireless module 105 can be arranged to omit, from the handover notify message 703, the LIPA bearer.

In an example, the target wireless module is an MME in accordance with, for example, the 3GPP release 11 family of standards. In order to trigger deactivation of the PDN session the target wireless module 105 can be arranged to omit, from the forward relocation complete notification 704, the LIPA bearer.

Figure 8:
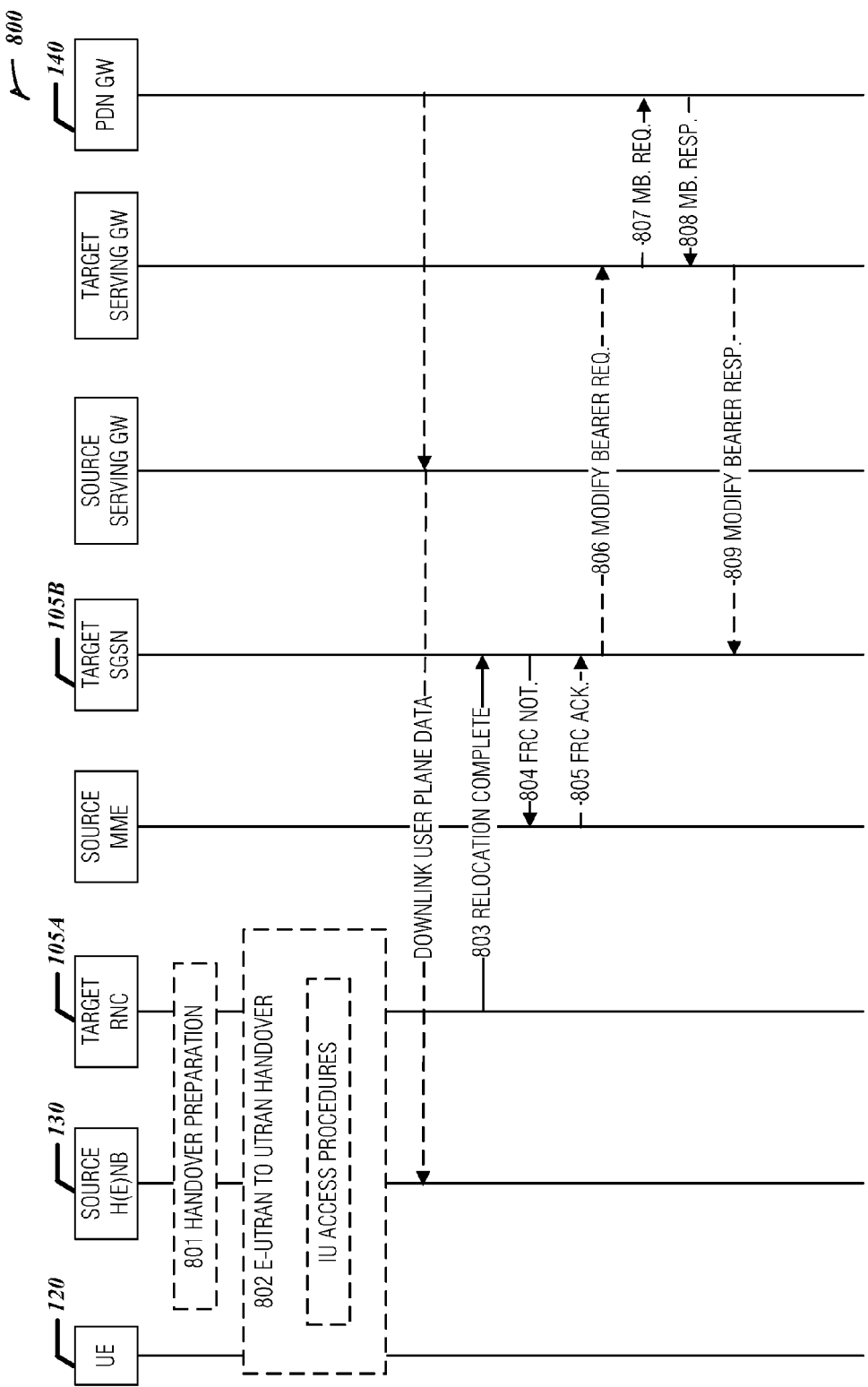
FIG. 8 is an example of an Iu interface sequence diagram illustrating portions of handover completion operation, according to an embodiment.

FIG. 8 is an example of an Iu interface sequence diagram illustrating portions of handover completion operation 800, according to an embodiment. In this example, the target wireless module 105 is an RNC in accordance with the UMTS family of standards. The following are the illustrated Iu UMTS messages and operational groups: handover preparation 801, E-UTRAN to UTRAN handover 802, a relocation complete message 803, a forward relocation complete notification 804, a forward relocation complete acknowledge 805, a modify bearer request 806, a modify bearer request 807, a modify bearer response 808, and a modify bearer response 809.

The part of the UE 102 handover operation includes one or more messages (e.g., from the handover preparation 801, the handover execution 202, or any illustrated message). The one or more message can include the UE LHN-ID for the UE 120 and can include the LIPA bearer for the PDN session. In order to determine that the target wireless module 105 is not in the source LHN 125, the target wireless module 105 can be arranged to determine that the LHN-ID of the target wireless module 105 is different than the UE LHN-ID. In order to trigger deactivation of the PDN session, the target wireless module 105 can be arranged to omit, from the relocation complete message 803, the LIPA bearer.

Figure 9:
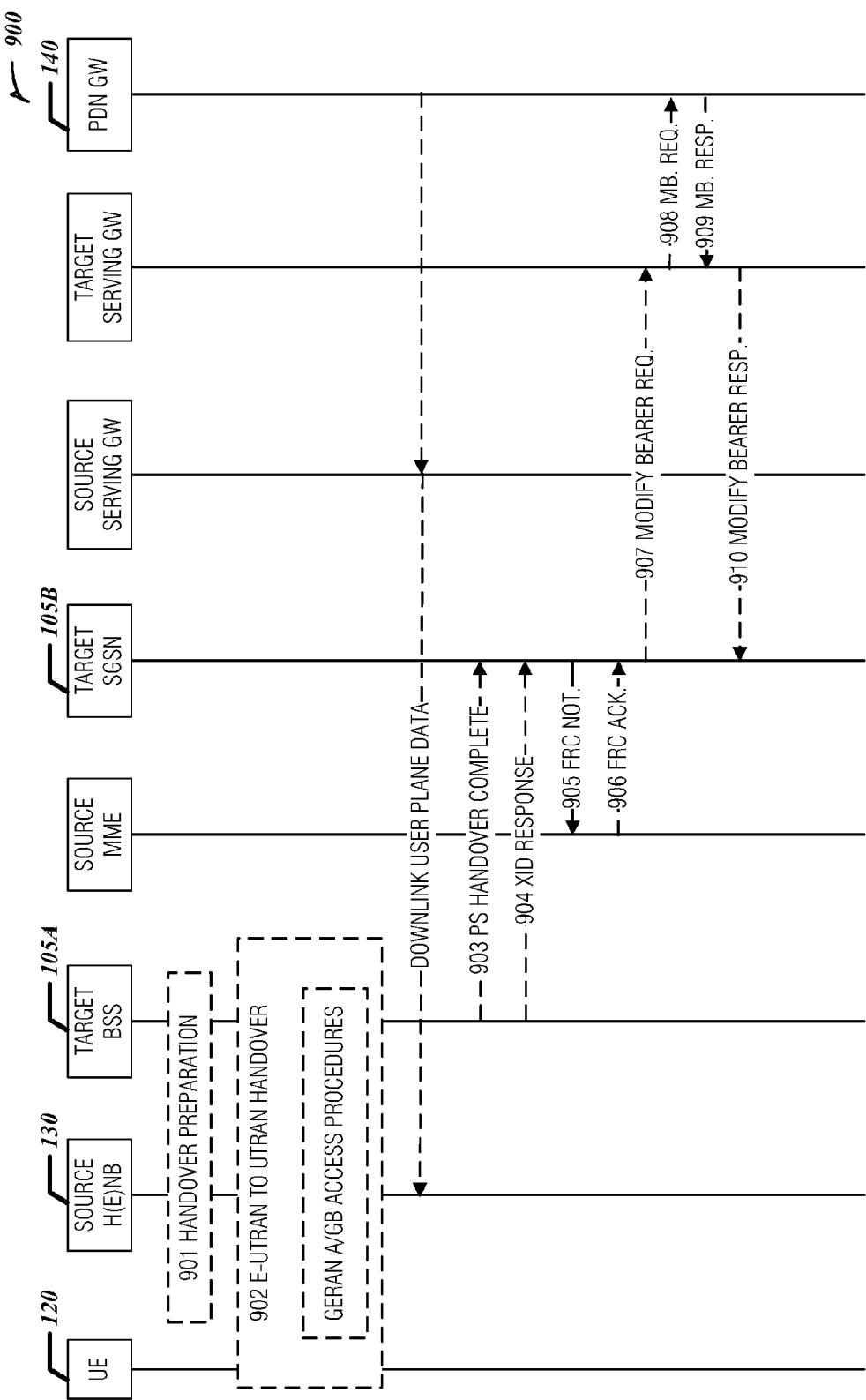
FIG. 9 is an example of an A/Gb interface sequence diagram illustrating portions of handover completion operation, according to an embodiment.

FIG. 9 is an example of an A/Gb interface sequence diagram illustrating portions of handover completion operation 900, according to an embodiment. In this example, the target wireless module 105 is a SGSN in accordance the 3GPP family of standards. The following are the illustrated A/Gb messages and operational groups: handover preparation 901, E-UTRAN to GERAN handover 902, a path switch handover complete message 903, an exchange identification response 904, a forward relocation notification 905, a forward relocation acknowledge 906, a modify bearer request 907, a modify bearer request 908, a modify bearer response 909, and a modify bearer response 910.

The part of the UE 102 handover operation includes one or more messages (e.g., from the handover preparation 901, the handover execution 902, or any illustrated message). The one or more message can include the UE LHN-ID for the UE 120 and can include the LIPA bearer for the PDN session. In order to determine that the target wireless module 105 is not in the source LHN 125, the target wireless module 105 can be arranged to determine that the LHN-ID of the target wireless module 105 is different than the UE LHN-ID. In order to trigger deactivation of the PDN session, the target wireless module 105 can be arranged to omit, from the relocation complete notification 905, the LIPA bearer.

Figure 10:
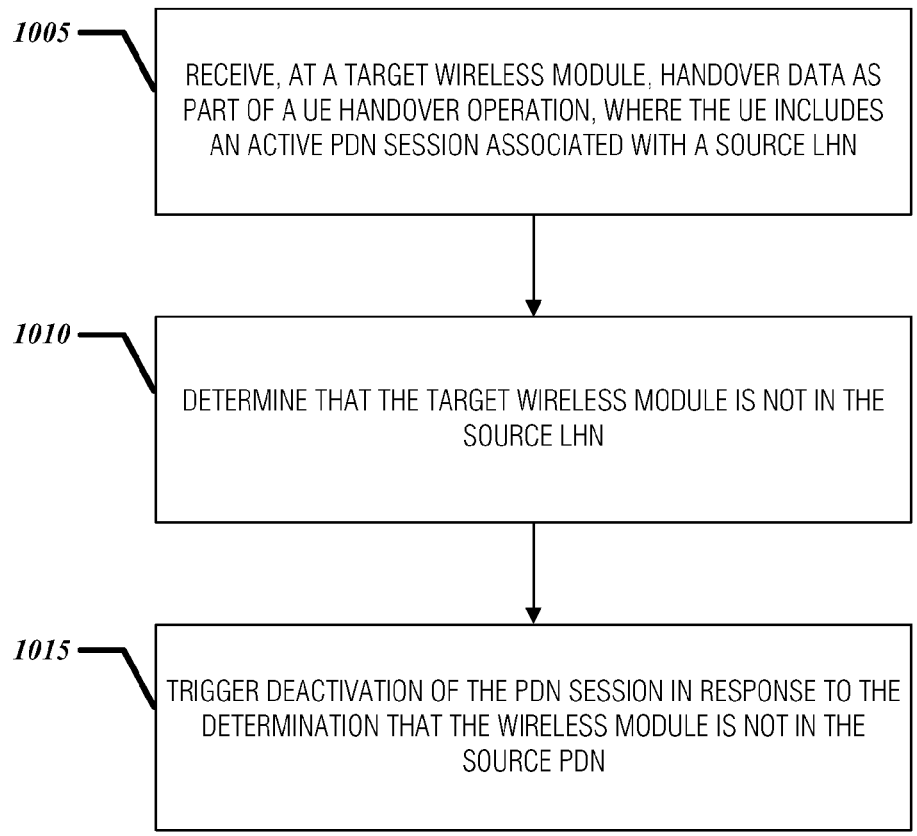
FIG. 10 is flowchart illustrating an example of a method for LIPA PDN release, according to an embodiment.

FIG. 10 is flowchart illustrating an example of a method 1000 for LIPA PDN release, according to an embodiment. Any elements described above with respect to FIGS. 1 through 9 may be used, in any combination, to implement the operations of method 1000.

At operation 1005, at the target wireless module 105, handover data can be received as part of the UE 120 handover operation. The UE 120 can include an active PDN session associated with the source LHN 125.

At operation 1010, a determination that the target wireless module 105 is not in the source LHN 125 can be made based on the handover data.

At operation triggering 1015, deactivation of the PDN session can be triggered by the target wireless module 105 in response to the determination that the target wireless module 105 is not in the source LHN.

In an example, triggering of the deactivation can occur during a handover preparation operation of the UE 120 handover operation. Additional examples of triggering PDN session deactivation during a handover preparation operation are given above with respect to FIGS. 2 through 5.

In an example, triggering of the deactivation can occur during a handover completion operation. The handover completion operation occurring after a handover preparation operation, where both the handover completion operation and the handover preparation operation are part of the UE 120 handover operation. Additional examples of triggering PDN session deactivation during a handover completion operation are given above with respect to FIGS. 6 through 9.

Figure 11:
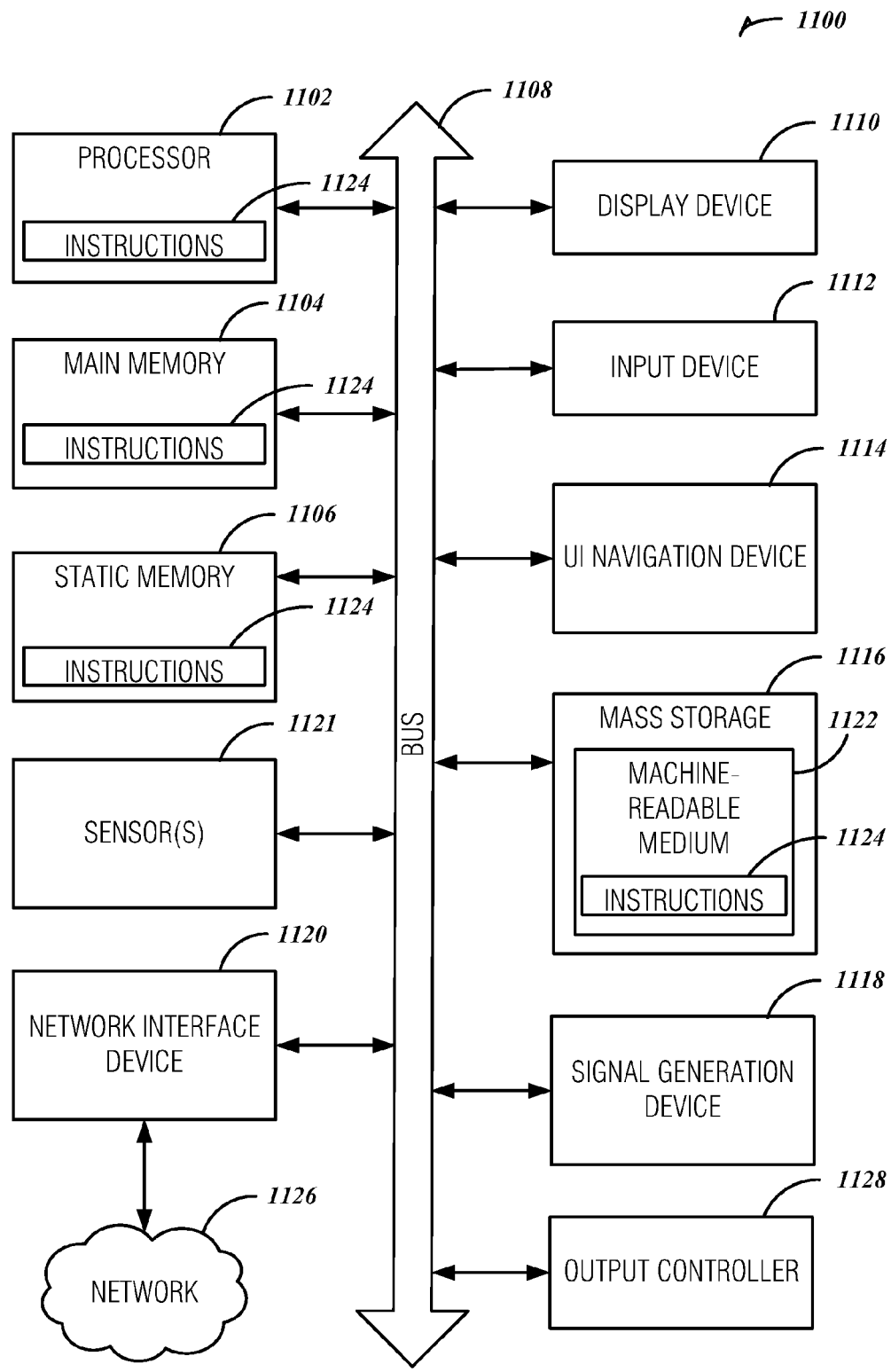
FIG. 11 is a block diagram illustrating an example of a machine upon which any one or more of the examples discussed herein can be implemented.

FIG. 11 illustrates an example machine 1100 upon which any one or more of the techniques (e.g., methodologies) discussed herein can perform. In alternative embodiments, the machine 1100 can operate as a standalone device or can be connected (e.g., networked) to other machines. In a networked deployment, the machine 1100 can operate in the capacity of a server machine, a client machine, or both in server-client network environments. In an example, the machine 1100 can act as a peer machine in peer-to-peer (P2P) (or other distributed) network environment. The machine 1100 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 1100 can include a hardware processor 1102 (e.g., a central processing unit (CPU), a graphics processing unit (GPU), a hardware processor core, or any combination thereof), a main memory 1104 and a static memory 1106, some or all of which can communicate with each other via a bus 1108. The machine 1100 can further include a display unit 1110, an alphanumeric input device 1112 (e.g., a keyboard), and a user interface (UI) navigation device 1111 (e.g., a mouse). In an example, the display unit 1110, input device 1117 and UI navigation device 914 can be a touch screen display. The machine 1100 can additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 can include an output controller 1128, such as a serial (e.g., universal serial bus (USB), parallel, or other wired or wireless (e.g., infrared (IR)) connection to communicate or control one or more peripheral devices (e.g., a printer, card reader, etc.).

The storage device 1116 can include a machine-readable medium 1122 on which is stored one or more sets of data structures or instructions 1124 (e.g., software) embodying or utilized by any one or more of the techniques or functions described herein. The instructions 1124 can also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 can constitute machine readable media.

While the machine-readable medium 1122 is illustrated as a single medium, the term "machine readable medium" can include a single medium or multiple media (e.g., a centralized or distributed database, and/or associated caches and servers) that arranged to store the one or more instructions 1124.

The term "machine-readable medium" can include any tangible medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 can further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 1120 can include one or more physical jacks (e.g., Ethernet, coaxial, or phone jacks) or one or more antennas to connect to the communications network 1126. In an example, the network interface device 1120 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Additional Notes & Examples

Example 1 can include subject matter (such as an apparatus, device, machine, system, or wireless module) arranged to receive handover data as part of a user equipment (UE) handover operation, the UE including an active packet data network (PDN) session associated with a source local home network (LHN). The subject matter can also be arranged to determine that the wireless module is not in the source LHN based on the handover data, and trigger deactivation of the PDN session in response to the determination that the wireless module is not in the source LHN.

In Example 2, the subject matter of Example 1 can optionally include, wherein the wireless module is arranged to trigger deactivation during a handover preparation operation of the UE handover operation.

In Example 3, the subject matter of Example 2 can optionally include, wherein the wireless module is a home eNB (HeNB) in accordance with a 3GPP family of standards, wherein the part of the UE handover operation is an X2 application protocol (X2AP) handover request in accordance with the 3GPP family of standards, the X2AP handover request including a UE LHN-ID for the UE and including a local IP access (LIPA) bearer for the PDN session, wherein to determine that the wireless module is not in the source LHN the wireless module is arranged to determine that an LHN-ID of the wireless module is different than the UE LHN-ID, and wherein to trigger deactivation of the PDN session the wireless module is arranged to omit, from an X2AP handover request acknowledge, the LIPA bearer.

In Example 4, the subject matter of one or any of Examples 2-3 can optionally include, wherein the wireless module is a home eNB (HeNB) in accordance with a 3GPP family of standards, wherein the part of the UE handover operation is an S1 application protocol (S1AP) handover request in accordance with the 3GPP family of standards, the S1AP handover request including a UE LHN-ID for the UE and including a local IP access (LIPA) bearer for the PDN session, wherein to determine that the wireless module is not in the source LHN the wireless module is arranged to determine that an LHN-ID of the wireless module is different than the UE LHN-ID, and wherein to trigger deactivation of the PDN session the wireless module is arranged to omit, from an S1AP handover request acknowledge, the LIPA bearer.

In Example 5, the subject matter of one or any of Examples 2-4 can optionally include, wherein the wireless module is a home eNB (HeNB) in accordance with a 3GPP release 10 family of standards, wherein the part of the UE handover operation is a handover request in accordance with a 3GPP family of standards, the handover request including at least one evolved universal mobile telecommunications systems terrestrial radio access network (E-UTRAN) radio access bearer (E-RAB) information element (IE) not defined in the 3GPP release 10 family of standards, the at least E-RAB IE being associated with a local IP access (LIPA) bearer for the PDN session, and wherein to trigger deactivation of the PDN session the wireless module is arranged to omit, from a handover request acknowledge, the at least one E-RAB IE.

In Example 6, the subject matter of one or any of Examples 2-5 can optionally include, wherein the wireless module is a radio network controller (RNC) in accordance with a 3GPP universal mobile telecommunications system (UMTS) family of standards, wherein the part of the UE handover operation is a UMTS relocation request, the UMTS relocation request including a UE LHN-ID for the UE and including a local IP access (LIPA) bearer for the PDN session, wherein to determine that the wireless module is not in the source LHN the wireless module is arranged to determine that an LHN-ID of the wireless module is different than the UE LHN-ID, and wherein to trigger deactivation of the PDN session the wireless module is arranged to omit, from a UMTS relocation request acknowledge, the LIPA bearer.

In Example 7, the subject matter of one or any of Examples 1-6 can optionally include, wherein the wireless module is arranged to trigger deactivation during a handover completion operation, the handover completion operation occurring after a handover preparation operation in the UE handover operation.

In Example 8, the subject matter of Example 7 can optionally include, wherein the wireless module is a home eNB (HeNB) in accordance with a 3GPP family of standards, wherein the part of the UE handover operation is one or more X2 application protocol (X2AP) messages in accordance with the family of standards, the one or more X2AP messages including a UE LHN-ID for the UE and including a local IP access (LIPA) bearer for the PDN session, wherein to determine that the wireless module is not in the source LHN the wireless module is arranged to determine that an LHN-ID of the wireless module is different than the UE LHN-ID, and wherein to trigger deactivation of the PDN session the wireless module is arranged to omit, from an S1 application protocol (S1AP) path switch request, the LIPA bearer.

In Example 9, the subject matter of one or any of Examples 7-8 can optionally include, wherein the part of the UE handover operation is one or more S1 application protocol (S1AP) messages in accordance with the 3GPP family of standards, the one or more S1AP messages including a UE LHN-ID for the UE and including a local IP access (LIPA) bearer for the PDN session, and wherein to determine that the wireless module is not in the source LHN the wireless module is arranged to determine that an LHN-ID of the wireless module is different than the UE LHN-ID.

In Example 10, the subject matter of Example 9 can optionally include, wherein the wireless module is a home eNB (HeNB) in accordance with a 3GPP family of standards, and wherein to trigger deactivation of the PDN session the wireless module is arranged to omit, from an S1AP handover notify message, the LIPA bearer.

In Example 11, the subject matter of one or any of Examples 9-10 can optionally include, wherein the wireless module is a mobility management entity (MME) in accordance with a 3GPP family of standards, and wherein to trigger deactivation of the PDN session the wireless module is arranged to omit, from an S1AP forward relocation complete notification, the LIPA bearer.

In Example 12, the subject matter of one or any of Examples 7-11 can optionally include, wherein the wireless module is a radio network controller (RNC) in accordance with a 3GPP universal mobile telecommunications system (UMTS) family of standards, wherein the part of the UE handover operation includes one or more messages including a UE LHN-ID for the UE and including a local IP access (LIPA) bearer for the PDN session, wherein to determine that the wireless module is not in the source LHN the wireless module is arranged to determine that an LHN-ID of the wireless module is different than the UE LHN-ID, and wherein to trigger deactivation of the PDN session the wireless module is arranged to omit, from a relocation complete message, the LIPA bearer.

In Example 13, the subject matter of one or any of Examples 7-12 can optionally include, wherein the wireless module is a serving general packet radio service (GPRS) support node (SGSN) in accordance with a 3GPP universal mobile telecommunications system (UMTS) family of standards, wherein the part of the UE handover operation includes one or more messages including a UE LHN-ID for the UE and including a local IP access (LIPA) bearer for the PDN session, wherein to determine that the wireless module is not in the source LHN the wireless module is arranged to determine that an LHN-ID of the wireless module is different than the UE LHN-ID, and wherein to trigger deactivation of the PDN session the wireless module is arranged to omit, from a relocation complete notification, the LIPA bearer.

Example 14 can include, or can optionally be combined with the subject matter of one or any combination of Examples 1-13 to include, subject matter (such as a method, means for performing acts, or machine-readable medium including instructions that, when performed by a machine cause the machine to performs acts) comprising receiving, at a target wireless module, handover data as part of a user equipment (UE) handover operation, the UE including an active packet data network (PDN) session associated with a source local home network (LHN), determining that the target wireless module is not in the source LHN based on the handover data, and triggering, by the target wireless module, deactivation of the PDN session in response to the determination that the target wireless module is not in the source LHN.

In Example 15, the subject matter of Example 14 can optionally include, wherein the triggering of the deactivation occurs during a handover preparation operation of the UE handover operation.

In Example 16, the subject matter of Example 15 can optionally include, wherein the target wireless module is a home eNB (HeNB) in accordance with a 3GPP family of standards, wherein the part of the UE handover operation is an X2 application protocol (X2AP) handover request in accordance with the 3GPP family of standards, the X2AP handover request including a UE LHN-ID for the UE and including a local IP access (LIPA) bearer for the PDN session, wherein determining that the target wireless module is not in the source LHN includes determining that a target wireless module's LHN-ID is different than the UE LHN-ID, and wherein triggering deactivation of the PDN session includes omitting, from an X2AP handover request acknowledge, the LIPA bearer.

In Example 17, the subject matter of one or any of Examples 15-16 can optionally include, wherein the target wireless module is a home eNB (HeNB) in accordance with a 3GPP family of standards, wherein the part of the UE handover operation is an S1 application protocol (S1AP) handover request in accordance with the 3GPP family of standards, the S1AP handover request including a UE LHN-ID for the UE and including a local IP access (LIPA) bearer for the PDN session, wherein determining that the target wireless module is not in the source LHN includes determining that a target wireless module's LHN-ID is different than the UE LHN-ID, and wherein triggering deactivation of the PDN session includes omitting, from an S1AP handover request acknowledge, the LIPA bearer.

In Example 18, the subject matter of one or any of Examples 15-17 can optionally include, wherein the target wireless module is a home eNB (HeNB) in accordance with a 3GPP release 10 family of standards, wherein the part of the UE handover operation is a handover request in accordance with a 3GPP family of standards, the handover request including at least one evolved universal mobile telecommunications systems terrestrial radio access network (E-UTRAN) radio access bearer (E-RAB) information element (IE) not defined in the 3GPP release 10 family of standards, the at least E-RAB IE being associated with a local IP access (LIPA) bearer for the PDN session, and wherein triggering deactivation of the PDN session includes omitting, from a handover request acknowledge, the at least one E-RAB IE.

In Example 19, the subject matter of one or any of Examples 15-18 can optionally include, wherein the target wireless module is a radio network controller (RNC) in accordance with a 3GPP universal mobile telecommunications system (UMTS) family of standards, wherein the part of the UE handover operation is a UMTS relocation request, the UMTS relocation request including a UE LHN-ID for the UE and including a local IP access (LIPA) bearer for the PDN session, wherein determining that the target wireless module is not in the source LHN includes determining that a target wireless module's LHN-ID is different than the UE LHN-ID, and wherein triggering deactivation of the PDN session includes omitting, from a UMTS relocation request acknowledge, the LIPA bearer.

In Example 20, the subject matter of one or any of Examples 14-19 can optionally include, wherein the triggering of the deactivation occurs during a handover completion operation, the handover completion operation occurring after a handover preparation operation, both the handover completion operation and the handover preparation operation being part of the UE handover operation.

In Example 21, the subject matter of Example 20 can optionally include, wherein the target wireless module is a home eNB (HeNB) in accordance with a 3GPP family of standards, wherein the part of the UE handover operation is one or more X2 application protocol (X2AP) messages in accordance with the 3GPP family of standards, the one or more X2AP messages including a UE LHN-ID for the UE and including a local IP access (LIPA) bearer for the PDN session, wherein determining that the target wireless module is not in the source LHN includes determining that a target wireless module's LHN-ID is different than the UE LHN-ID, and wherein triggering deactivation of the PDN session includes omitting, from an S1 application protocol (S1AP) path switch request, the LIPA bearer.

In Example 22, the subject matter of one or any of Examples 20-21 can optionally include, wherein the part of the UE handover operation is one or more S1 application protocol (S1AP) messages in accordance with the 3GPP family of standards, the one or more S1AP messages including a UE LHN-ID for the UE and including a local IP access (LIPA) bearer for the PDN session, and wherein determining that the target wireless module is not in the source LHN includes determining that a target wireless module's LHN-ID is different than the UE LHN-ID.

In Example 23, the subject matter of Example 22 can optionally include, wherein the target wireless module is a home eNB (HeNB) in accordance with a 3GPP family of standards, and wherein triggering deactivation of the PDN session includes omitting, from an S1AP handover notify message, the LIPA bearer.

In Example 24, the subject matter of one or any of Examples 22-23 can optionally include, wherein the target wireless module is a mobility management entity (MME) in accordance with a 3GPP family of standards, and wherein triggering deactivation of the PDN session includes omitting, from an S1AP forward relocation complete notification, the LIPA bearer.

In Example 25, the subject matter of one or any of Examples 20-24 can optionally include, wherein the target wireless module is a radio network controller (RNC) in accordance with a 3GPP universal mobile telecommunications system (UMTS) family of standards, wherein the part of the UE handover operation includes one or more messages including a UE LHN-ID for the UE and including a local IP access (LIPA) bearer for the PDN session, wherein to determine that the wireless module is not in the source LHN includes determining that an LHN-ID of the target wireless module is different than the UE LHN-ID, and wherein triggering deactivation of the PDN session includes omitting, from a relocation complete message, the LIPA bearer.

In Example 26, the subject matter of one or any of Examples 20-25 can optionally include, wherein the target wireless module is a serving general packet radio service (GPRS) support node (SGSN) in accordance with a 3GPP universal mobile telecommunications system (UMTS) family of standards, wherein the part of the UE handover operation includes one or more messages including a UE LHN-ID for the UE and including a local IP access (LIPA) bearer for the PDN session, wherein determining that the target wireless module is not in the source LHN includes determining that a target wireless module's LHN-ID is different than the UE LHN-ID, and wherein triggering deactivation of the PDN session includes omitting, from a relocation complete notification, the LIPA bearer.

Example 27 can include, or can optionally be combined with the subject matter of one or any combination of Examples 1-26 to include, subject matter (such as a method, means for performing acts, or machine-readable medium including instructions that, when performed by a machine cause the machine to performs acts) comprising receiving handover data as part of a user equipment (UE) handover operation, the UE including an active packet data network (PDN) session associated with a source local home network (LHN), determining that the wireless module is not in the source LHN based on the handover data, and triggering deactivation of the PDN session in response to the determination that the wireless module is not in the source LHN.

In Example 28, the subject matter of Example 27 can optionally include, wherein the triggering of the deactivation occurs during a handover preparation operation of the UE handover operation.

In Example 29, the subject matter of one or any of Examples 27-28 can optionally include, wherein the triggering of the deactivation occurs during a handover completion operation, the handover completion operation occurring after a handover preparation operation, both the handover completion operation and the handover preparation operation being part of the UE handover operation.

Example 30 can include, or can optionally be combined with the subject matter of one or any combination of Examples 1-26 to include, subject matter (such as an apparatus, device, machine, system, or wireless module) comprising a source wireless module in a source local home network (LHN), the source wireless module arranged to deactivate an active packet data network (PDN) session for a user equipment (UE) in response to receiving a network interface handover message, and a target wireless module. The target wireless module can be arranged to receive handover data as part of a UE handover operation, the UE including the active PDN session associated with the source LHN, determine that the wireless module is not in the source LHN based on the handover data, and trigger deactivation of the PDN session via the network interface handover message in response to the determination that the wireless module is not in the source LHN.

In Example 31, the subject matter of Example 30 can optionally include, wherein to trigger deactivation of the PDN session via the network interface handover message, the target wireless module is configured to omit a local IP access (LIPA) bearer of the PDN session from the network interface handover message.

In Example 32, the subject matter of Example 31 can optionally include, wherein the source wireless module is a mobility management entity (MME) in accordance with a 3GPP family of standards, and wherein to deactivate the active PDN session the source wireless module is configured to deactivate active PDN sessions whose associated LIPA bearers are not in the network interface handover message.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A circuit-implemented wireless module comprising:
   receiver circuitry configured to receive handover data as part of a user equipment (UE) handover operation, the UE including an active packet data network (PDN) session associated with a source local home network (LHN), wherein the part of the UE handover operation is at least one of a handover preparation operation or a handover completion operation, the handover completion operation occurring after the handover preparation operation, the handover preparation operation being at least one of a handover operation, an X2 application protocol (X2AP) handover request, an S1 application protocol (S1AP) handover request, or a 3GPP universal mobile telecommunications system (UMTS) relocation request, the handover completion operation being at least one of X2AP message or an S1AP message, the handover operation including a UE LHN-ID for the UE and a local IP access (LIPA) bearer for the PDN session; and
   processor circuitry configured to:
      determine that the wireless module is not in the source LHN based on the handover data, including determining that an LHN-ID of the wireless module is different than the UE LHN-ID; and
      trigger deactivation of the PDN session in response to the determination that the wireless module is not in the source LHN, including omitting the LIPA bearer from an acknowledgment to the handover operation.

2. The wireless module of claim 1, wherein the acknowledgment is an X2AP handover request acknowledge when the handover operation is an X2AP handover request.

3. The wireless module of claim 1, wherein the acknowledgment is an S1AP handover request acknowledge when the handover operation is an S1AP handover request.

4. The wireless module of claim 1, wherein the acknowledgment is a UMTS relocation request acknowledge when the handover operation is a UMTS relocation request.

5. The wireless module of claim 1, wherein the acknowledgment is an S1AP path switch request when the handover operation is an X2AP message.

6. The wireless module of claim 1, wherein the acknowledgment is S1AP handover notify message or an S1AP forward relocation complete notification when the handover operation is an S1AP message.

7. The wireless module of claim 1, wherein the wireless modules is a home eNB (HeNB) in accordance with a 3GPP family of standards or a radio network controller (RNC) in accordance with a UMTS family of standards.

8. A method comprising:
receiving, at a target wireless module, handover data as part of a user equipment (UE) handover operation, the UE including an active packet data network (PDN) session associated with a source local home network (LHN), wherein the part of the UE handover operation is at least one of a handover preparation operation or a handover completion operation, the handover completion operation occurring after the handover preparation operation, the handover preparation operation being at least one of a handover operation, an X2 application protocol (X2AP) handover request, an S1 application protocol (S1AP) handover request, or a 3GPP universal mobile telecommunications system (UMTS) relocation request, the handover completion operation being at least one of X2AP message or an S1AP message, the handover operation including a UE LHN-ID for the UE and a local IP access (LIPA) bearer for the PDN session;
determining that the target wireless module is not in the source LHN based on the handover data including determining that an LHN-ID of the wireless module is different than the UE LHN-ID; and
triggering, by the target wireless module, deactivation of the PDN session in response to the determination that the target wireless module is not in the source LHN, including omitting the LIPA bearer from an acknowledgment to the handover operation.

9. The method of claim 8, wherein the acknowledgment is an X2AP handover request acknowledge when the handover operation is an X2AP handover request.

10. The method of claim 8, wherein the acknowledgment is an S1AP handover request acknowledge when the handover operation is an S1AP handover request.

11. The method of claim 8, wherein the acknowledgment is a UMTS relocation request acknowledge when the handover operation is a UMTS relocation request.

12. The method of claim 8, wherein the acknowledgment is an S1AP path switch request when the handover operation is an X2AP message.

13. The method of claim 8, wherein the acknowledgment is SLAP handover notify message or an S1AP forward relocation complete notification when the handover operation is an S1AP message.

14. The method of claim 8, wherein the wireless modules is a home eNB (HeNB) in accordance with a 3GPP family of standards or a radio network controller (RNC) in accordance with a UMTS family of standards.

15. A non-transitory machine-readable medium including instructions, which when executed by a wireless module, cause the wireless module to perform operations, the operations comprising:
receiving handover data as part of a user equipment (UE) handover operation, the UE including an active packet data network (PDN) session associated with a source local home network (LHN), wherein the part of the UE handover operation is at least one of a handover preparation operation or a handover completion operation, the handover completion operation occurring after the handover preparation operation, the handover preparation operation being at least one of a handover operation, an X2 application protocol (X2AP) handover request, an S1 application protocol (S1AP) handover request, or a 3GPP universal mobile telecommunications system (UMTS) relocation request, the handover completion operation being at least one of X2AP message or an S1AP message, the handover operation including a UE LHN-ID for the UE and a local IP access (LIPA) bearer for the PDN session;
determining that the wireless module is not in the source LHN based on the handover data including determining that an LHN-ID of the wireless module is different than the UE LHN-ID; and
triggering deactivation of the PDN session in response to the determination that the wireless module is not in the source LHN, including omitting the LIPA bearer from an acknowledgment to the handover operation.

16. The machine-readable medium of claim 15, wherein the acknowledgment is an X2AP handover request acknowledge when the handover operation is an X2AP handover request.

17. The machine-readable of claim 15, wherein the acknowledgment is an S1AP handover request acknowledge when the handover operation is an S1AP handover request.

18. The machine-readable of claim 15, wherein the acknowledgment is a UMTS relocation request acknowledge when the handover operation is a UMTS relocation request.

19. The machine-readable of claim 15, wherein the acknowledgment is an S1AP path switch request when the handover operation is an X2AP message.

20. The machine-readable of claim 15, wherein the acknowledgment is S1AP handover notify message or an S1AP forward relocation complete notification when the handover operation is an S1AP message.

21. The machine-readable of claim 15, wherein the wireless modules is a home eNB (HeNB) in accordance with a 3GPP family of standards or a radio network controller (RNC) in accordance with a UMTS family of standards.

* * * * *